United States Patent [19]
Kubo et al.

[11] 3,744,347
[45] July 10, 1973

[54] SHIFT CONTROL SYSTEM FOR ENGINE MOUNTED AUTOMOBILE AUTOMATIC TRANSMISSIONS

[75] Inventors: Seitoku Kubo; Takakazu Mori; Chihiro Hayashi, all of Toyota Japan

[73] Assignee: Toyota Jidosha Kogyo Kabushiki Kaisha, Toyota-shi, Japan

[22] Filed: May 19, 1971

[21] Appl. No.: 144,926

[30] Foreign Application Priority Data
May 22, 1970 Japan.............................. 45/43769

[52] U.S. Cl........................ 74/866, 74/336, 74/365, 74/752
[51] Int. Cl........................................... B60k 21/00
[58] Field of Search....................... 74/866, 365, 336, 74/752

[56] References Cited
UNITED STATES PATENTS
3,068,715  12/1962  Brennan et al. ...................... 74/866

Primary Examiner—C. J. Husar
Attorney—Cushman, Darby & Cushman

[57] ABSTRACT

A shift control system for engine mounted automobile automatic transmissions comprising a low speed forward drive ratio one-way clutch provided to obtain the required gear shifting engagement of a gear train, friction engagement means with hydraulic servo units for providing intermediate speed and high speed forward ratios, and electro-hydraulic control means for generating electrical signals corresponding to the driving conditions of the automobile to control the operations of the one-way clutch and the friction engagement means, whereby when the automobile is driven with the engine output torque lower than a predetermined value, a shift is effected directly from the high speed forward drive ratio to the low speed forward drive ratio to permit the automobile to coast at the low speed forward drive ratio under the overrunning condition.

5 Claims, 11 Drawing Figures

Patented July 10, 1973

INVENTORS

Kubo et al

BY Cushman, Darby & Cushman

ATTORNEYS

SHIFT CONTROL SYSTEM FOR ENGINE MOUNTED AUTOMOBILE AUTOMATIC TRANSMISSIONS

BACKGROUND OF THE INVENTION

1. Field of the Invention

The present invention generally relates to automobile automatic transmissions and more particularly to a control system therefor which combines both electrical and hydraulic controls.

2. Description of the Prior Art

Generally, with an automatic transmission of the type which has forward drive ratios for low, intermediate and high speeds (an automatic transmission having more than three speeds), when an automobile is coasting at the high speed forward drive ratio, for example, the car speed gradually decreases so that it is reduced to the intermediate speed, and in this case it is possible that the so-called engine driven condition at the high speed gear where the automobile driven wheels are driven by the engine changes to the engine braking condition at the intermediate speed gear where the driven wheels of the automobile drive the engine. In the course of this change in the drive, the reversal of direction of the drive results in abnormal noise due to the play of the automobile driving mechanisms as well as the impact due to variations of the torque.

To solve these problems, the present invention contemplates a shift control system for an automatic transmission wherein the power transmission mechanism of the transmission is provided with one-way clutch for a low speed drive ratio, whereby the one-way clutch operates as a reaction force element for the transmission gear system when the engine drives the driven wheels of the automobile, and the one-way clutch operates to prevent the engine braking when the driven wheels of the automobile drive the engine. By employing the power transmission mechanism in the manner just described, the present invention contemplates, during deceleration, to directly shift the transmission from the high speed forward drive to the low speed forward drive without first shifting the transmission to the intermediate speed drive, when the automobile is coasting under the low engine torque condition, that is, with the engine throttle being practically closed.

By effecting the shift control as stated above, the previously mentioned abnormal noise and impact may be prevented. Although the concept of the aforementioned direct shift from a high speed forward drive to a low speed forward drive through a hydraulic control system has hitherto been proposed, the development of an actual system embodying such a concept has been almost impossible, because during operations at the low vehicle speed range and the low engine throttle range where the above-mentioned shift control is necessary, hydraulic pressure signals required for effecting the control are unstable and vary excessively, and moreover, the computational precision of the shift points is inferior.

SUMMARY OF THE INVENTION

In order to solve these deficiencies, the object of the present invention is to provide a shift control system which effects the above-mentioned control both electrically and hydraulically. According to the system of the present invention, the detection of signals required for the controls and the computations for signal setting are performed entirely electrically, and therefore it is possible to ensure accurate shift control with a simple circuit construction as compared with that of the prior art systems in which the controls are solely effected hydraulically. Moreover, since the required engine throttle opening signals for shift controls are accurately detected in the form of stepped electrical signals by means of a throttle opening responsive switch which may consist of a reed switch and a magnet rotor, the required vehicle signals are detected by subjecting the signals from a rotational speed detector to D-A conversion to produce accurate signals corresponding to the vehicle speeds over the low and high speed ranges, and further the computations of shift points are performed properly by means of comparator circuits, it is possible to effect the required downshift control under the coasting condition without producing any effect on the shift points under other running conditions of the vehicle.

DESCRIPTION OF THE PREFERRED EMBODIMENT

Figure 3:
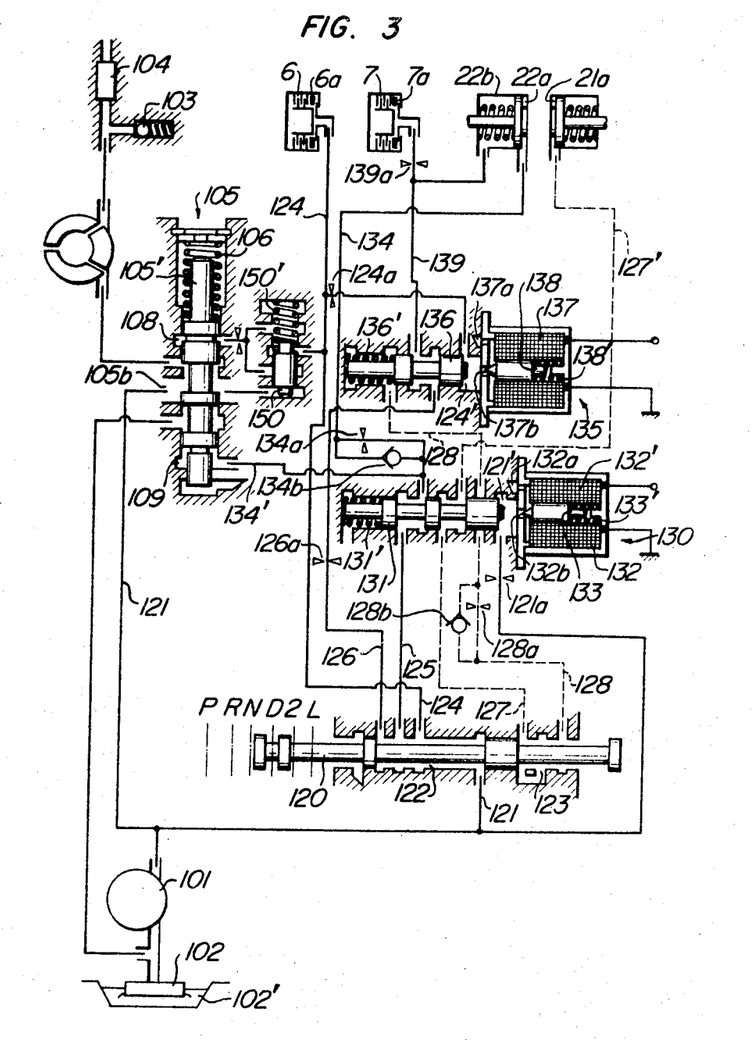
FIG. 3 is a hydraulic diagram showing the construction of a hydraulic control circuit constituting a control section of the transmission.
Figure 4:
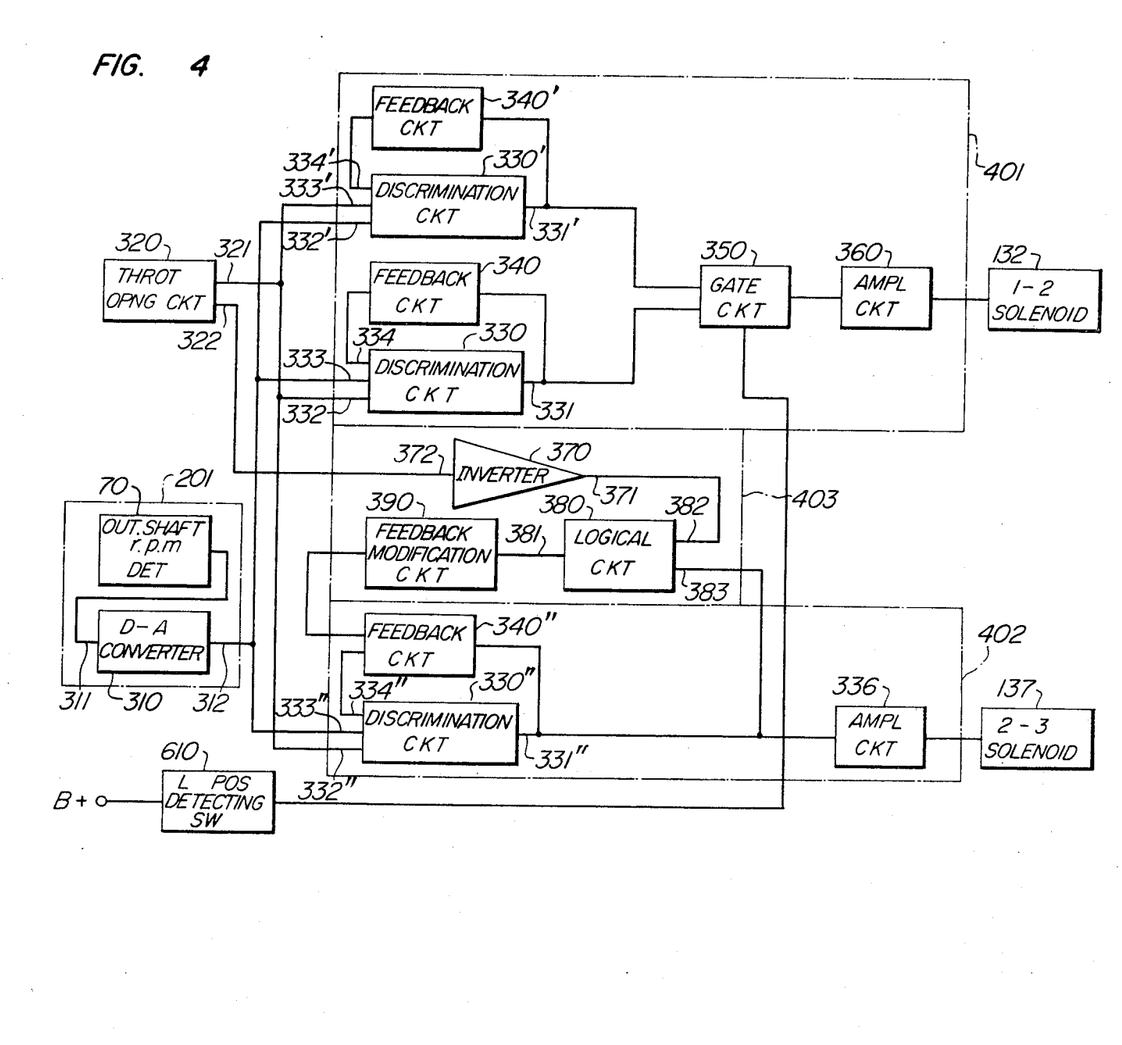
FIG. 4 is a block diagram showing the construction of an electrical control circuit constituting a control section of the transmission.

An embodiment of the present invention will now be explained with reference to FIGS. 1 and 2 which illustrate a transmission controlled by the control system of the present system. The control system comprises a hydraulic control section (FIG. 3) and an electrical control section (FIG. 4).

Figure 1:
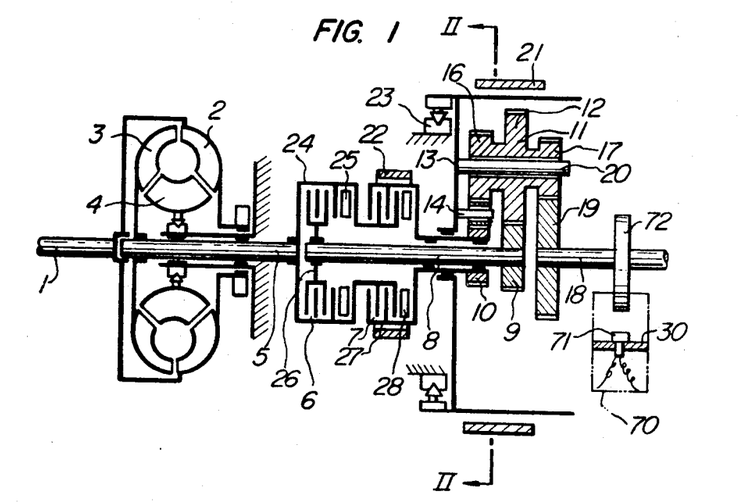
FIG. 1 is a schematic view showing by way of an example the principle of a transmission system used with the system of the present invention.
Figure 2:
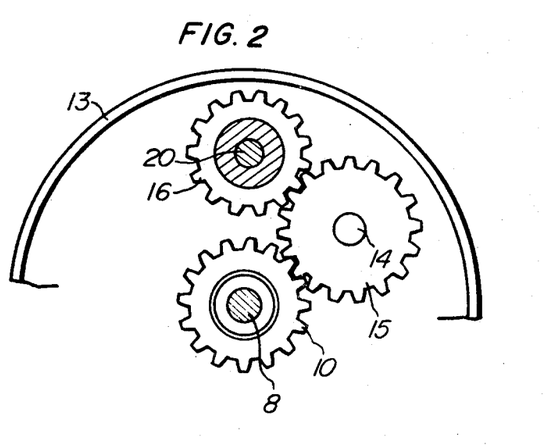
FIG. 2 is a partial sectional view taken along the line I—I of FIG. 1, showing in detail the relationships between an idler gear not shown in FIG. 1 and the gears associated therewith.

As is apparent from FIGS. 1 and 2, the transmission comprises a torque converter and a planetary gear system having three forward speeds and one reverse speed. The torque converter is of the conventional type comprising a pump turbine 2, a turbine wheel 3 and a stator 4, and the pump turbine 2 is connected to an engine crankshaft 1 and the turbine wheel 3 is connected to a turbine shaft 5 to impart rotatory power to the input shaft of the planetary gear system. The planetary gear system comprises two multi-plate clutches, two hydraulic brake band units and a one-way clutch employing sprags, all of which are engaged by means of hydraulic servo motors, and a planetary gear train consisting of sun gears and pinion gears. The turbine shaft 5 is connected to an intermediate shaft 8 having an input sun gear 9 by way of a front clutch 6 and to reverse sun gear 10 by a rear clutch 7. A brake band means 22 (hereinafter referred to as a front brake band) is mounted around the outer periphery of the rear clutch to lock the reverse sun gear 10 and it is operated by the hydraulic servo. The input sun gear 9 is meshed with a gear 12 of pinion gears 11 consisting of a suitable number of pinions (e.g., two or three) which are positioned around the input sun gear 9. The reverse sun gear 10 is meshed with an idler gear 15 on a carrier 13 and a gear 16 of the pinions 11 is meshed with the idler gear 15. The rearmost gear 17 of the pinion gears 11 is meshed with a gear 19 mounted on an output shaft 18 of the transmission. The pinion gears 11 and the idler gear 15 are mounted on the carrier 13 by means of pinion pins 20 and 14 and the carrier 13 is provided with a controlling brake band 21 (hereinafter referred to as a rear brake band) which is operated by the hydraulic servo. The carrier 13 is also provided with a one-way clutch 23 which holds the carrier 13 stationary against rotation in one direction.

With the arrangement described above, the operation of the transmission will now be explained.

In the first speed, the front clutch 6 and the rear brake band 21 are applied (However, when the drive is provided from the engine side, the one-way clutch 23 will also be applied so that it is not necessarily required to apply the rear brake band 21. In this case, however, no power will be transmitted from the output shaft 18). The rotation of the turbine shaft 5 is carried to the input sun gear 9, and the carrier 13 is locked by the rear brake band 21 and hence the pinion pin 20 is also held stationary, so that the input power is transmitted through the gear 9 and the gear 12 and through the gear 17 to the gear 19 on the output shaft at a reduced speed.

In the second speed, the front clutch 6 and the front brake band 22 are applied. The input is applied by way of the input sun gear 9, and the reverse sun gear 10 is held stationary since a clutch drum 27 is locked by the front brake band 22. The rotation of the input sun gear 9 causes the carrier 13 to rotate in the same direction as the input sun gear 9 by the reaction force of the reverse sun gear 10, so that the gear 19 on the output shaft 18 is caused to rotate at a reduced speed.

The third speed is obtained by applying the front clutch 6 and the rear clutch 7. Since the input is applied by way of both the input sun gear 9 and the reverse sun gear 10, the whole planetary gear train rotates as a unit so that the turbine shaft 5 and the output shaft 18 are driven at a ratio of 1 : 1.

The reverse is obtained by applying the rear clutch 7 and the rear brake band 21. The carrier 13 and hence the pinion pins 14 and 20 are held stationary, so that the input from the turbine shaft 5 is transmitted to the gear 19 on the output shaft 18 by way of the reverse sun gear 10, the idler gear 15 and the gears 16 and 17 of the pinion gears 11. The output shaft 18 thus rotates in the opposite direction.

Next, the hydraulic control section (FIG. 3) of the control system will be explained.

The necessary oil pressure to the hydraulic circuit is supplied by a pump 101 employing gears, vanes or the like. The pump 101 is driven by a shaft directly connected to the engine and fluid pressure is delivered to an oil passage 121 from an oil reservoir 102' through an oil screen 102. The oil passage 121 is connected to a pressure regulator valve 105 and a manual valve 120. The pressure regulator valve 105 is of the type which has been widely used as a pressure regulator valve for automobile transmissions, and it comprises a spring 106 and a valve spool 105' so that the oil pressure admitted into chambers 108 and 109 having differential valve areas is balanced against the spring force to regulate the oil pressure. The oil pressure regulated by the pressure regulator valve 105 is called a line pressure. The oil pressure admitted into the chamber 108 is controlled by the manul valve 120 and a relay valve 150, while the oil pressure admitted into the chamber 109 is controlled by the manual valve 120 and a 1-2 shift valve 131. Now, with an oil pressure being supplied to an oil passage 124 from the manual valve 120, the relay valve 150 is placed in its lower position (FIG. 3) by a spring 150' and the pump pressure (the line pressure) is admitted into the chamber 108. In this state, when no oil pressure is admitted into an oil passage 134' from the 1-2 shift valve 131 and the chamber 109 is emptied, the pressure regulator valve 105 regulates the oil pressure to a constant high oil pressure $P_{LH}$ (the line pressure) simply by means of the force of the oil pressure acting on the differential area in the chamber 108. Then, when oil pressure is supplied to the oil passage 134' from the 1-2 shift valve 131, the pressure regulator valve 105 regulates the line pressure to oil pressure $P_{LL}$ lower than $P_{LH}$ to balance the force of the oil pressure acting on the differential areas in the chambers 108 and 109 against the force of the spring 106. On the other hand, when the oil passage 124 is exhausted, the relay valve 150 performs a pressure regulating action so that the pump pressure from the chamber at the lower end of the relay valve 150 is reduced by a valve equivalent to the spring force of the spring 150' and it is then admitted into the chamber 108. Thus, the oil pressure produced by the pressure regulator valve 105 is increased by a value equivalent to the reduced pressure by the relay valve 150 so that the line pressure is regulated to become an oil pressure $P_{HH}$ higher than $P_{LH}$.

The oil pressure regulated by the pressure regulator valve 105 is supplied to the manual valve 120. The manual valve 120 is linked to the shift lever installed in the driver's seat and it has six positions: P, R, N, D, 2 and L as shown in FIG. 3. When the manual valve 120 is in the N position, the oil passage 121 is shut off and valve chambers 122 and 123 are released. With the manual valve 120 in the D position, the conditions shown in FIG. 3 result so that the oil passage 121 communicates with the oil passages 124, 125 and 126. The oil passage 124 is directly connected to a front clutch servo chamber 6a, the oil passage 125 is connected to a front brake band actuating side servo chamber 22a through a 1-2 shift means 130, and the oil passage 126 is connected to a rear clutch servo chamber 7a and a front brake band release side servo chamber 22b through a 2-3 shift means 135. When the manual valve 120 is in the 2 position, the oil passage 126 leading to the 2-3 shift means 135 is exhausted and the oil passages 124 and 126 communicate with the oil passage 121. When the manual valve 120 is moved to the L position, the oil passages 125 and 126 are exhausted and the oil passages 124 and 127 communicate with the oil passage 121. The oil passage 127 is connected to the front brake band actuating side servo chamber 22a through the 1-2 shift means 130 and through an oil passage 134 and it is also connected to a rear brake band servo chamber 21a through an oil passage 127'. When the manual valve 120 is moved to the R position, the shift valve 136 to its rightward position by means of the spring 136'. On the other hand, when the solenoid 137 is not energized, the solenoid orifice 137b is closed by a solenoid plunger 138 and the 2-3 shift valve 136 is moved to its leftward position by the oil pressure in the chamber 124'.

Several hydraulic servos of the transmission are operated according to the various positions of the manual valve 120, 1-2 shift valve 131 and 2-3 shift valve 136 described above so as to determine the driving gear positions. The following table gives a summary of the positions of the manual valve 120, the on and off conditions of the 1-2 solenoid 132 and the 2-3 solenoid 137, the driving gear positions and the operating conditions of the hydraulic servos:

| Manual valve position | | 1-2 solenoid | 2-3 solenoid | Front clutch | Rear clutch | Front brake band | Rear brake band | One-way clutch |
|---|---|---|---|---|---|---|---|---|
| D | 1st speed | On | On | O | X | X | X | O |
|   | 2nd speed | Off | On | O | X | O | X | X |
|   | 3rd speed | Off | Off | O | O | X | X | X |
| 2 | 1st speed | On |  | O | X | X | X | O |
|   | 2nd speed | Off |  | O | X | O | X | X |
| L | 1st speed | Off |  | O | X | X | O | (O) |
|   | 2nd speed | On |  | O | X | O | X | X |
| R |  | Off | Off | X | O | X | O | X | oil passages 124, 125 and 126 are exhausted and the oil passages 127 and 128 communicate with the oil passage 121. The oil passage 128 is also connected to the rear clutch servo chamber 7a through the 2-3 shift means 135.

The 1-2 shift means 130 comprises the 1-2 shift valve 131, a 1—2 solenoid 132 and a spring 131', and the 1-2 solenoid 132 consists of a plunger 133, a spring 133', a coil 132' and so on. A chamber 121' defined between the right end of the 1-2 shift valve 131 and the solenoid 132 is supplied with oil pressure by way of the oil passage 121 through an orifice 121a. The 1-2 solenoid 132 is controlled with signals from the electrical control section, so that when the solenoid 132 is not energized, the plunger 133 is placed in its leftward position and hence a solenoid orifice 132b is closed by the spring 133' to shut off the chamber 121'. Consequently, the 1-2 shift valve 131 is moved to its leftward position by the oil pressure in the chamber 121'. When the 1-2 solenoid 132 is energized, the plunger 133 is moved to its rightward position by electromagnetic force to discharge the oil pressure in the chamber 121' to an exhaust port 132a by way of the orifice 132b (In this case, the orifice 121' is so small as compared with the orifice 132b that practically no residual pressure develops in the chamber 121'). Consequently, the valve 131 is moved to its rightward position by the spring 131'.

The 2-3 shift means 135 comprises a 2-3 shift valve 136, a spring 136' and a 2-3 solenoid 137. The 2-3 solenoid 137 is identical to that of the 1-2 solenoid 132. A chamber 124' defined between the 2-3 shift valve 136 and the 2-3 solenoid 137 is supplied with oil pressure by way of the oil passage 124 through an orifice 124a. In this case, the dimension of the orifice 124a is small as compared with that of a solenoid orifice 137b so that when the solenoid 137 is energized, the oil pressure in the chamber 124' is exhausted to move the 2-3

In the table, ON indicates the energized condition of the solenoids; OFF the de-energized condition of the solenoids; oblique lines the conditions where, in the 2 and L positions, the oil passage 126 is exhausted and thus no oil pressure is supplied to the release sides of the rear clutch and the front brake band, irrespective of whether the 2-3 solenoid is in the ON or OFF state, while, in the R position, the oil passage 124 is exhausted and hence the chamber 124 is emptied so that, irrespective of whether the 2-3 solenoid is in the ON or OFF state, the 2-3 shift valve is moved to its rightward position to thereby communicate the oil passage 128 with the oil passage 139. With regard to the hydraulic servo conditions, O indicates the servos in action and X indicates the servos out of action, so that when the power is transmitted from the engine to the transmission output shaft in the L position-first speed, that is, for driving the engine, the one-way clutch is brought into action. Moreover, as will be apparent from the table, when both of the 1-2 and 2-3 solenoids are not energized, that is, when the two solenoids are in the OFF state, the L position-first speed, the 2 position-second speed and the D position-third speed are obtained, so that even when no current is supplied to the solenoids due to any failure of the electrical control system, the vehicle can be driven without any inconvenience.

On the other hand, when the manual valve 120 is in the L, 2 or D position and the 1-2 solenoid 132 is in the OFF state, the 1-2 shift valve 131 is placed in its leftward position so that oil pressure is supplied to the oil passage 134, i.e., the chamber 109 of the pressure regulator valve 105 to regulate the line pressure to the low oil pressure $P_{LL}$. On the contrary, when the 1-2 solenoid is in the ON state, the chamber 109 is emptied so that the line pressure becomes the high oil pressure $P_{LH}$.

As described above, the 1-2 and 2-3 solenoids are energized or de-energized to provide the proper gear position to suit the drive conditions and to modify the pressure regulating operation of the pressure regulator valve 105, and the necessary commands are supplied from the electrical control section.

As shown in FIG. 4, the electrical control section comprises a throttle opening circuit 320, an output shaft rpm detecting means 201, an L position detecting switch 610, a 1–2 shift point computing circuit 401, a 2–3 shift point computing circuit 402, and a 3–2 shift point modification circuit 403. It is to be noted that unless otherwise specified, the signals referred to hereinafter will means DC voltages from the positive plate with the negative plate being grounded.

The L position detecting switch 601 is one which applies the power supply voltage to a gate circuit 360 that will be explained later, when the manual valve 120 is in the L position, and this switch may be incorporated in a neutral safety switch for controlling the supply of the power supply voltage to the electrical control section.

Figure 5A:
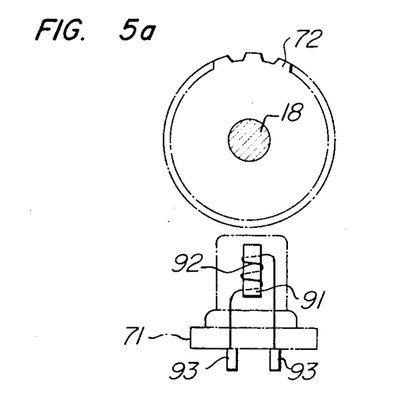
FIG. 5a and 5b are schematic diagrams for explaining the structure of a rpm detector used with the electrical control section of FIG. 4.
Figure 5B:
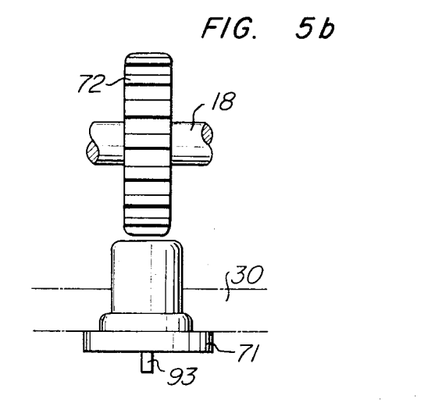

The output shaft rpm detecting means 201 comprises an output shaft rpm detector 70 and D-A converter 310. As shown in FIGS. 5a and 5b, the output shaft rpm detector 70 is composed of a rpm indicator 71 secured to a housing 30 of the transmission and a toothed disk 72 integrally mounted on the output shaft 18 of the transmission. The toothed disk 72 consists of a circular plate of a magnetic material having teeth formed on its periphery in an equally spaced relationship as shown in FIG. 5a illustrating the side view of the disk 72, and the rpm indicator 71 is secured to the housing 30 at a position externally very close to the disk 72 in the diametrical direction of the latter. The rpm indicator 71 consists of a permanent magnet 91 and a coil 92 wound on the former and they are housed in a suitable casing of a non-magnetic material, and this casing is mounted on the housing 30 so that one end of the permanent magnet 91 is located very closely to the outer periphery of the toothed disk 72. As the toothed disk 72 rotates so that its teeth portions pass through the magnetic field of the permanent magnet 91, the leakage flux of the permanent magnet 91 varies, producing an electromotive force in the coil 92. In this manner, an alternating voltage signal having a frequency proportional to the number of revolutions of the output shaft 18 is taken from an output terminal 93 and this signal is applied to the input of the D-A converter 310 by way of a line 311.

Figure 6:
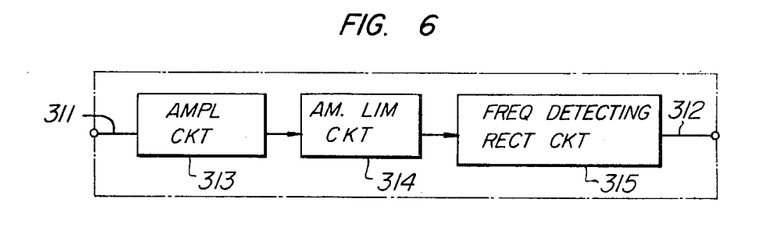
FIG. 6 is a block diagram showing the construction of a D-A converter circuit used with the electrical control section.

The D-A converter 310 is a circuit in which the applied alternating voltage signal, i.e., a digital signal is converted into a DC voltage or an analog signal and it is constructed as shown in FIG. 6. The alternating voltage applied by way of the line 311 is amplified by an amplifier circuit 313, the resultant amplitude is then limited by an amplitude limiter circuit 314, and this AC voltage is further converted by a frequency detecting rectifier circuit 315 into a DC voltage proportional to the frequency, which is in turn taken out from a line 312. This DC voltage is an analog voltage proportional to the number of revolutions of the output shaft 18, i.e., the vehicle speed. It is self-evident that in addition to the method just described, various other methods may be employed to obtain an analog voltage proportional to the vehicle speed, such as one in which a DC generator adapted to be driven by the output shaft 18 is installed to utilize its output voltage.

Figure 7:
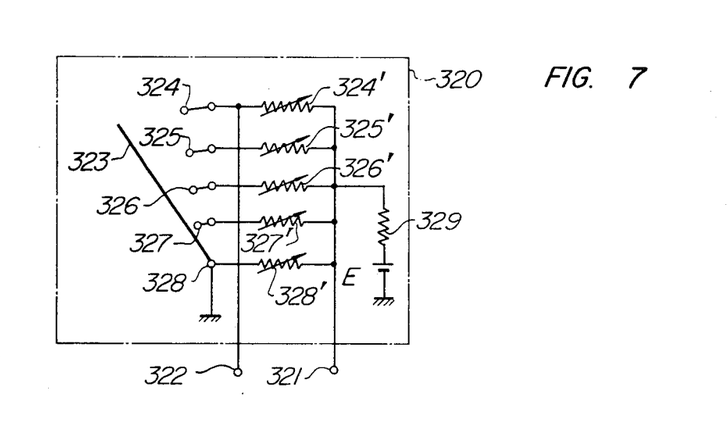
FIG. 7 is a diagram showing the construction of a throttle opening circuit used with the electrical control section.

Next, the construction of the throttle opening circuit 320 will be explained. This circuit 320 is shown in FIG. 7. In the figure, numeral 322 designates a multi-stage switch designed to respond to the throttle opening which is a parameter of the engine torque. The switch 322 is provided with a movable contact 323 and fixed contacts 324, 325, 326 and 327 so that as the throttle opening changes from the fully closed throttle $Se(1)$ to $Se(2)$, $Se(3)$, $Se(4)$ and the wide open throttle $Se(5)$, the movable contact 323 is successively released from the fixed contacts 324, 325, 326 and 327. The movable contact 323 is connected to a variable resistor 328' and it is also grounded. The fixed contacts 324, 325, 326 and 327 are connected to variable resisters 324', 325', 326' and 327', respectively. The other ends of the variable resistors 324' through 328' are all connected to a constant voltage source E by way of a resistor 329, and the junction points of the variable resistors 324' through 328' and the resistor 329 are connected to a throttle opening signal output terminal 321. The fixed contact 324 is also connected to a set opening signal output terminal 322. With the construction described above, a resistance value $R_5$ of the variable resistor 328' is adjusted so that when the throttle opening changes to the wide open throttle $Se(5)$, the output voltage at the throttle opening signal output terminal 321 is $[R_5/(R+R_5)]E = E(5)$, where $R$ is the resistance value of the resistor 329. A resistance value $R_4$ of the variable resistor 327' is so adjusted that at the opening $Se(4)$, that is, when the movable contact 323 engages the fixed contact 327, the output voltage at the output terminal 321 is: $[R_4 \parallel R_5/(R_4 \parallel R_5 + R)]E = E(4)$, where $R_4 \parallel R_5$ is the resistance value obtained when the variable resistors 327' and 328' are connected in parallel. In like manner, resistance values $R_3$, $R_2$ and $R_1$ of the variable resistors 326', 325' and 324' are adjusted so that the output voltage at the output terminal 321 changes to $E(3)$, $E(2)$ and $E(1)$ as the throttle opening changes to $Se(3)$, $Se(2)$ and $Se(1)$, respectively. Thus, stepped voltage $E(N)$ are delivered at the throttle opening signal output terminal 321 according to the throttle openings $Se(N)(N = 1, 2, 3, 4$ and $5)$. While the present embodiment has been described as employing four fixed contacts, more complicated stepped voltages, if desired, may be obtained by simply increasing the number of fixed contacts correspondingly. The set throttle opening voltage output terminal 322 delivers an output voltage when the throttle opening is larger than $Se(2)$, while it is maintained at ground potential when the throttle opening is less than $Se(2)$. Thus, it delivers an output signal representing the low throttle opening smaller than the set opening.

Figure 8:
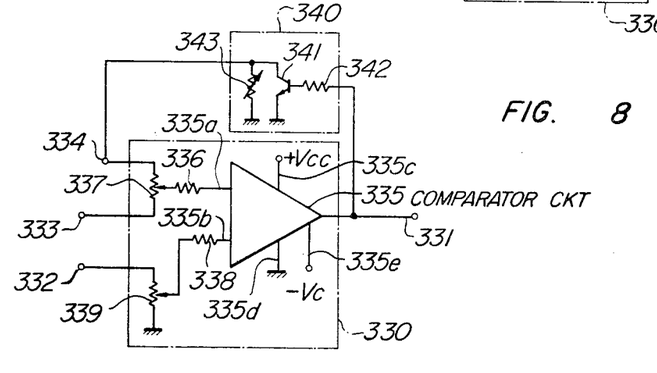
FIG. 8 is a diagram showing the constructions of a discrimination circuit and a feedback circuit used with the electrical control section.

Next, the 1–2 shift point computing circuit 401 will be explained. The 1–2 shift point computing circuit 401 comprises discrimination circuits 330 and 330', feedback circuits 340 and 340', a gate circuit 350 and an amplifier circuit 360. The constructions of the discrimination circuit 330 and the feedback circuit 340 are shown in FIG. 8. In the figure, numeral 335 designates a comparat'r circuit which may be easily constructed with integrated circuits now available on the market (for example, NEC's μpc 71 and the TI Company's SN 7271ON); 336 an input resistor whose one end is connected to an input terminal 335a of the comparator circuit 335 and the other end is connected to the movable terminal of a variable resistor 337. The two fixed terminals of the variable resistor 337 are connected to input terminals 333 and 334 of the discrimination circuit 330. Numeral 338 designates an input terminal whose one end is connected to an input terminal 335b of the comparator circuit 335 and the other end is connected to the movable terminal of a variable resistor 339. One end of the fixed terminal of the variable resistor 339 is connected to an input terminal 332 of the discrimination circuit 330 and the other end is grounded. Numerals 335c, 335d and 335e designate a positive power supply terminal, a grounding terminal and a negative power supply terminal of the comparator circuit 335. The feedback circuit 340 comprises a NPN transistor 341, a resistor 342 and a variable resistor 343. The emitter of the transistor 341 is grounded, the transistor ase is connected to an output terminal 331 of the discrimination circuit 330 (the output terminal of the comparator circuit 335) by way of the resistor 342, and the transistor collector is connected to one end of the variable resistor 343 and to the input terminal 334 of the discrimination circuit 330. The other end of the variable resistor 343 is grounded. In operation, assuming that a one signal (the presence of a voltage) is produced at the output terminal 331 when no input signals are introduced at the input terminals 332 and 333 of the discrimination circuit 330, the transistor 341 of the feedback circuit 340 is turned on, since a current is supplied to the base thereof by way of the resistor 342, and the potential at the input terminal 334 of the discrimination circuit 330 becomes substantially equal to ground potential. On the other hand, when the aforesaid throttle opening signal (voltage) E(N) is applied to the input terminal 332 and the aforesaid analog voltage $E_n$ (hereinafter referred to as an output shaft rpm signal) proportional to the revolutions of the output shaft is applied to the input terminal 333, then a voltage $E'_n$ across the movable terminal of the variable resistor 337 is: $E'_n = [R_b/(R_a+R_b)]E_n$ and a voltage $E'(N)$ across the movable terminal of the variable resistor 339 is: $E'(N) = [R_d/(R_c+R_d)]E(N)$, where $R_a$ is the resistance value between the input terminal 333 and the movable terminal of the variable resistor 337, $R_b$ is the resistance value between this movable terminal and the collector of the transistor 341, $R_c$ is the resistance value between the movable terminal of the variable resistor 359 and the input terminal 332, and $R_d$ is the resistance value between the last-mentioned movable terminal and the ground. In other words, the voltage $E'_n$ is applied to the input terminal 335a of the comparator circuit 335 by way of the input terminal 336 and the voltage $E'(N)$ is applied to the input terminal 335b by way of the input terminal 338. he comparator circuit 335 compares the two voltage $E'_n$ and $E'(N)$ so that if the result of the comparison $E'_n - E'(N)$ is positivb, then a zero signal (the absence of a signal voltage) appears at the output terminal 331, while a one signal appears at the output terminal 331 when the result of the comparison is negative. When there is the condition $E'_n - E'(N) > 0$ so that the signal at the output terminal 331 of the discrimination circuit 330 changes to one, the transistor 341 of the feedback circuit 340 is turned off, since no base current is supplied therrto. In this state, the output terminal 334 of the discrimination circuit 330 is grounded by way of the variable resistor 343, so that if $R_e$ represents the resistance value of the variable resistor 343, then the potential at the input terminal 335a of the comparator circuit 335 is: $E''_n = [(R_b + R_e)/(R_a + R_b + R_e)]E_n$ and hence $E''_n > E'_n$ for the same $E_n$.

Thus, the signal at the output terminal 331 of the comparator circuit 335 changes from zero to one at a lower value (lower vehicle speed) of the output shaft rpm signal $E_n$ than when it changes from one to zero. In other words, depending on whether the signal at the output terminal 331 is zero or one, the feedback circuit 340 varies the correction (dividing ratio) of the output shaft rpm signal $E_n$ by the resistors to change the discrimination conditions of the discrimination circuit 330. in this manner, the signals at the output terminals 331 may be stabilized to prevent the occurrence of any phenomenon that would cause "hunting" of the signals between one and zero.

Figure 9:
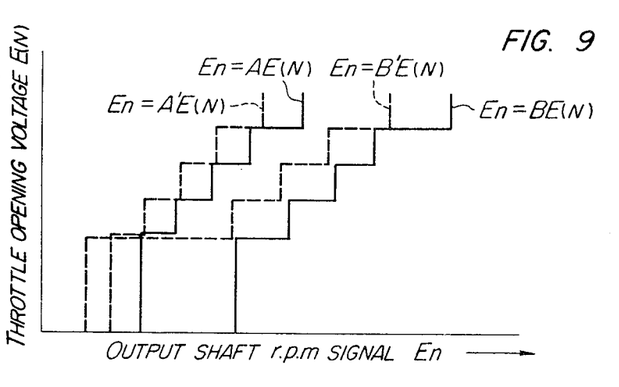
FIG. 9 is a graph showing, with the shift lever located in the driver's compartment (or the manual valve in the hydraulic control section) in the D position (or the 2 position), the relationships between the output shaft rpm signal and the throttle opening signal so as to explain the operations of the discrimination circuit and the feedback circuit in the electrical control section.

In the manner described above, the variable resistors 337, 339 and 343 of the discrimination circuit 330 and the feedback circuit 330 and the feedback circuit 340 may be suitably adjusted to establish the relation: $E_n = AE(N)$ between the output shaft rpm signal $E_n$ and the throttle opening signal $E(N)$ when the signal at the output terminal 331 changes from one to zero and another relation $E_n = A'E(N)$ between the two signals when the signal at the output terminal 331 changes from zero to one. This is shown in FIG. 9. In this figure, if the signal $E_n$ increases and deviates into the region to the right of the curve $E_n = AE(N)$, then the signal at the output terminal 331 changes from one to zero. Contrary, if the signal $E_n$ decreases and deviates into the region to the left of the curve $E_n = A'E(N)$, then the signal at the output terminal 331 changes from zero to one.

Next, the discrimination circuit 330', the feedback circuit 340' and the gate circuit 350 will be explained. The discrimination circuit 330' and the feedback circuit 340' are identical in construction to the discrimination circuit 330 and the feedback circuit 340, respectively. However, while the throttle opening signal $E(N)$ is applied to the input terminal 332 and the output shaft rpm signal $E_n$ is applied to the input terminal 333 in the discrimination circuit 330, the output shaft rpm signal $E_n$ is applied to an input terminal 332' and the throttle opening signal $E(N)$ is applied to an input terminal 333' in the discrimination circuit 330', so that the relations between the two input signals which determine the signal at the output terminal 331' of the discrimination circuit 330' are reversed. The gate circuit 350 selects either one of the output signals from the discrimination circuits 330 and 330' so as to supply the selected signal to the amplifier circuit 360, so that when the L position detecting switch 610 is on, the output signal from the discrimination circuit 330' is supplied to the amplifier circuit 360, while the output signal from the discrimination circuit 330 is supplied to the amplifier circuit 360 when the switch 610 is not on. The reason for providing these circuits resides in the fact that in the hydraulic control section the operations of the 1–2 solenoid 132 required to obtain the first and second speeds must be reversed, depending on whether the manual valve 120 is in the L position, or in the 2 and D positions. Thus, for the purpose of the present invention, there can be no inconvenience, even it is considered that the output terminal 331 of the discrimination circuit 330 is directly connected to the input terminal of the amplifier circuit 360, and therefore no detailed explanation of these circuits will be made.

The amplifier circuit 360 may be of known construction and its function is to operate the 1–2 solenoid 132. Therefore, the amplifier circuit 360 may be dispensed with, if the solenoid 132 can be operated with the output voltage from the gate circuit 350.

Figure 10:
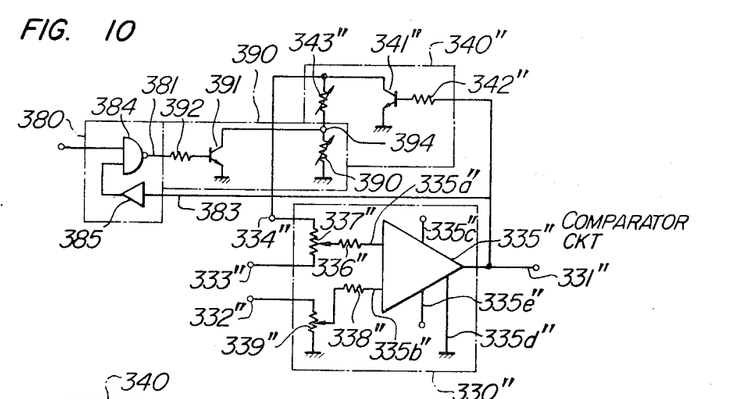
FIG. 10 is a circuit diagram showing a 3–2 shift point modification circuit.

Next, the 2–3 shift computing circuit 402 and the 3–2 shift point modification circuit 403 be explained. The 2–3 shift point computing circuit 402 comprises a discrimination circuit 330″, a feedback circuit 340″ and an amplifier circuit 366, while the 3–2 shift point modification circuit 403 comprises an inverter circuit 370, a logical circuit 380 and a feedback modification circuit 390. The discrimination circuit 330″, feedback circuit 340″ and amplifier circuit 366 of the 2–3 shift point computing circuit 402 function similarly with the discrimination circuit 330, feedback circuit 340 and amplifier circuit 360 of the 1–2 shift point computing circuit 401. The constructions of the discrimination circuit 330″, feedback circuit 340″, logical circuit 380 and feedback modification circuit 390 are shown in FIG. 10. In like manner with the 1–2 shift point computing circuit, the discrimination circuit 330″ computes the relation $E_n = BE(N)$ between the output shaft rpm signal $E_n$ and the throttle opening voltage $E(N)$ when the signal at an output terminal 331″ changes from one to zero and another relation $E_n = B'E(N)$ when the signal at the output terminal 331″ changes from zero to one. However, as shown in FIG. 9, the curve $E_n = B'E(N)$ is considerably moved away from the curve $E_n = BE(N)$ in the region where the values of the throttle opening voltage $E_n$ are low and at the same time it is established in the region of the low $E_n$ values as compared with the curve $E_n = A'E(N)$. This constitutes a characteristic feature of the present invention and it is achieved by the 3–2 shift modification circuit 403. In FIG. 10, the logical circuit 380 comprises an inverter circuit 385 and a NAND circuit 384, and the input terminal of the inverter circuit 385 is connected to an input terminal 383 of the logical circuit 380 and the input terminal 383 is connected to an output terminal 331″ of the discrimination circuit 330″. The output terminal of the inverter circuit 385 is connected to one input terminal of the NAND circuit 384 whose other input terminal is connected to an input terminal 382 of the logical circuit 380 and the input terminal 382 is also connected to an output terminal 371 of an inverter circuit 370 (FIG. 3). The output terminal of the NAND circuit 384 is connected to the input terminal of the feedback modification circuit 390 by way of a line 381. The feedback modification circuit 390 comprises a transistor 391, a resistor 392 and a variable resistor 393. The emitter of the transistor 391 is grounded, the transistor base is connected to the input terminal of the feedback modification circuit 390 by way of a resistor 392, and the transistor collector is grounded by way of the variable resistor 393 and is also connected to one end of a variable resistor 343″ of the feedback circuit 340″. The above-mentioned inverter circuit and the NAND circuit may be of any known constructions.

The operation of the 3–2 shift point modification circuit 403 will now be explained. The inverter circuit 370 receives at its input the signal from the set opening signal output terminal 322 of the throttle opening circuit 320 to produce an inverter signal of the input signal, and this inverter output signal is then applied to the input terminal 382 of the logical circuit 380. Since the signal from the set opening signal output terminal is zero when the throttle opening is smaller than the set opening and the signal is one when the throttle opening is larger than the set opening, the input signal to the input terminal 382 is one when the throttle opening is smaller than the set opening, while it is zero when the throttle opening is larger than the set opening. When a zero signal is applied to the input terminal 382, that is, when the throttle opening is larger than the set opening, the output signal produced by the logical circuit 380 is one irrespective of the input signal applied to the other input terminal 383 so that the transistor 391 of the feedback modification circuit 390 is turned on to maintain a junction point 394 of the variable resistor 343″ in the feedback circuit 340″ and the variable resistor 393 in the feedback modification circuit 390 at substantially ground potential. In this case, the operation of the feedback circuit 340″ is identical to the feedback circuit 340 of the 1–2 shift point computing circuit 401, that is, it simply performs a function to prevent the hunting of signals at the output terminal 331″ of the discrimination circuit 330″. Then, when the input signal applied to the input terminal 382 is one, that is, when the throttle opening is smaller than the set opening, the introduction of a one signal at the other input terminal 383, that is, the presence of a one signal at the output terminal 331″ of the discrimination circuit 330″ brings the inverter circuit 385 into operation so that the signal is inverted and applied as the zero signal to the input of the NAND circuit 384. Thus, one of the inputs to the NAND circuit 384 is one and the other is zero and hence the output signal of the logical circuit 380 is also one, so that the junction point 394 is substantially maintained at ground potential and thus no effect is produced on the operation of the feedback circuit 340″. On the other hand, when the input signal to the input terminal 382 is one, that is, when the throttle opening is smaller than the set opening, the introduction of a zero signal at the other input terminal 383, that is, the production of a zero output signal by the discrimination circuit 330″ brings the inverter circuit 385 into operation so that the signal is inverted and applied as one signal to the NAND circuit 384. Thus, both of the inputs to the NAND circuit 384 are one and hence the output signal of the logical circuit 380 is zero, so that no current is supplied to the base of the transistor 391 of the feedback modification circuit 390 and the transistor 391 is turned off. Consequently, the junction point 394 is grounded by way of the variable resistor 393. In this case, the voltage $E'''_n$ at an input terminal 335a″ of the comparator circuit 335″ which corresponds to the output shaft rpm signal $E_n$ applied to the input terminal 333″ of the discrimination circuit 330″ is given as: $E'''_n = [(R_b'' + R_e'' + R_f)/(R_a'' + R_b'' + R_e'' + R_f)]E_n$, where $R_a''$ is the resistance value between the input terminal 333″ and the movable terminal of the variable resistor 337″, $R_b''$ is the resistance value between this movable terminal and the collector of the transistor 341″, $R_e''$ is the resistance value of the variable resistor 343″ and $R_f$ is the resistance value of the variable resistor 393. This value of $E'''_n$ is apparently higher than that of the voltage $[(R_b'' + R_e'')/R_a'' + R_b'' + R_e'')]E_n$ appearing at the input terminal 335a″ when the transistor 391 is one and thus the signal at the output terminal 331″ of the discrimination circuit 330″ changes from zero to one at a lower value of the output shaft rpm signal $E_n$. In other words, the 3–2 shift point modification circuit 403 causes the feedback circuit 340″ to increasingly vary the discrimination conditions of the discrimination circuit 340″ at small throttle openings. Moreover, it is self-evident that while in the embodiment described above the method of modifying the output shaft rpm signal $E_n$ has been explained, exactly the same effect can be obtained by modifying the throttle opening voltage $E(N)$.

When the relations shown in FIGS. 9 are satisfied by the arrangement described above, at a certain small throttle opening less than the set opening, the value of the output shaft rpm signal $E_n$ at which the 2–3 solenoid 137 is turned on becomes lower than the value of the signal $E_n$ at which the 1–2 solenoid 132 is turned on. Consequently, in the hydraulic control section the 1–2 shift valve 131 is moved to its rightward position with the 2–3 shift valve 136 remaining in its leftward position and then the 2–3 shift valve 136 is moved to its rightward position, so that the transmission directly changes from the third speed to the first speed skipping over the second speed, thereby achieving the object of the present invention.

While a specific embodiment of the present invention has been described, the principal purpose of the present invention resides entirely in that a low engine torque range is electrically detected so that at this low engine torque range the transmission changes gears to shift from the high speed forward drive directly to the low speed forward drive omitting the intermediate speed forward drive through the combination of the electrical controls and the hydraulic controls. Thus, it is apparent to those who can fully understand the technical concept of the present invention that many variations and modifications of the embodiment are possible. For example, while in the embodiment described above the shift point is determined according to the comparison between the throttle opening voltage and the output shaft rpm signal, it is not departing from the scope and spirit of the present invention to determine the shift point according to any other suitable signal which constitutes a parameter of the vehicle driving conditions. For instance, the shift point may be determined according to the slip factor between the pump and the turbine of a torque converter.

We claim:

1. A shift control system for engine mounted automobile automatic transmissions comprising a one-way clutch for establishing a low speed forward drive ratio in the transmission, friction engagement means with hydraulic servos for establishing an intermediate speed forward drive ratio and a high speed forward drive ratio, a hydraulic pressure source for supplying hydraulic pressures to said friction engagement elements, shift valves for distributing the hydraulic pressures to said friction engagement elements to establish a selected one of said drive ratios, engine torque responsive electrical signal generating means, means for generating a parameter electrical signal which varies as a function of an engine parameter relating to a driving condition of the automobile shift point computing circuits for receiving said parameter signal generating electrical signals to operate said shift valves to establish said selected drive ratio according to said parameter signal, and a shift point modification circuit for modifying the shift point computed by said shift point computing circuits according to said electrical signals generated when the engine torque is lower than a predetermined value, whereby when the automobile is driven with the engine torque lower than said predetermined value, a shift is effected directly from the high speed forward drive ratio to the low speed forward drive ratio to thereby permit the automobile to coast at the low speed forward drive ratio under the overrunning condition.

2. A shift control system for engine mounted automobile automatic transmissions according to claim 1, wherein said shift valves comprise a first shift valve to distribute a hydraulic pressure to the hydraulic servo for establishing said intermediate speed forward drive ratio, and a second shift valve to distribute a hydraulic pressure to the hydraulic servo for establishing said high speed forward drive ratio.

3. A shift control system for engine mounted automobile automatic transmissions according to claim 1, wherein said parameter generating means including means for generating vehicle speed responsive electrical signals.

4. A shift control system for engine mounted automobile automatic transmissions according to claim 2, wherein said parameter generating means including means for generating vehicle speed responsive electrical signals.

5. A shift control system for engine mounted automobile automatic transmissions according to claim 4, wherein when the vehicle decelerates while being driven at the high speed forward drive ratio with the engine torque lower than said predetermined value, said shift point modification circuit comes into operation to cause said first shift valve to exhaust the hydraulic pressure supply to the hydraulic servo for establishing the intermediate speed forward drive ratio prior to or at the instant said second shift valve exhausts the hydraulic pressure supply to the hydraulic servo for establishing the high speed forward drive ratio, whereby the vehicle speed is directly reduced from the high speed forward drive ratio to the low speed forward drive ratio to permit the automobile to coast at the low speed forward drive ratio under the overrunning condition.

* * * * *